Feb. 23, 1932.    T. Z. MANUEL    1,846,885
SLEET CUTTER OR SCRAPER FOR AUTOMOBILE WINDSHIELDS
Filed Aug. 16, 1930
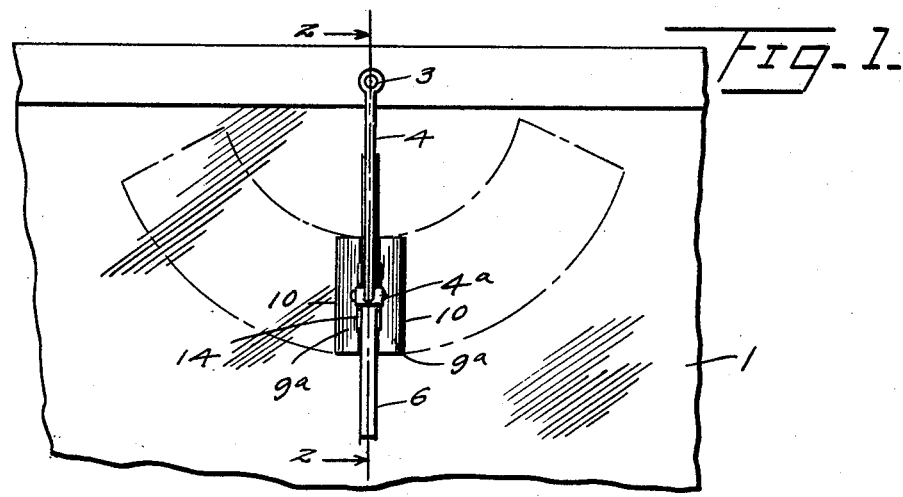
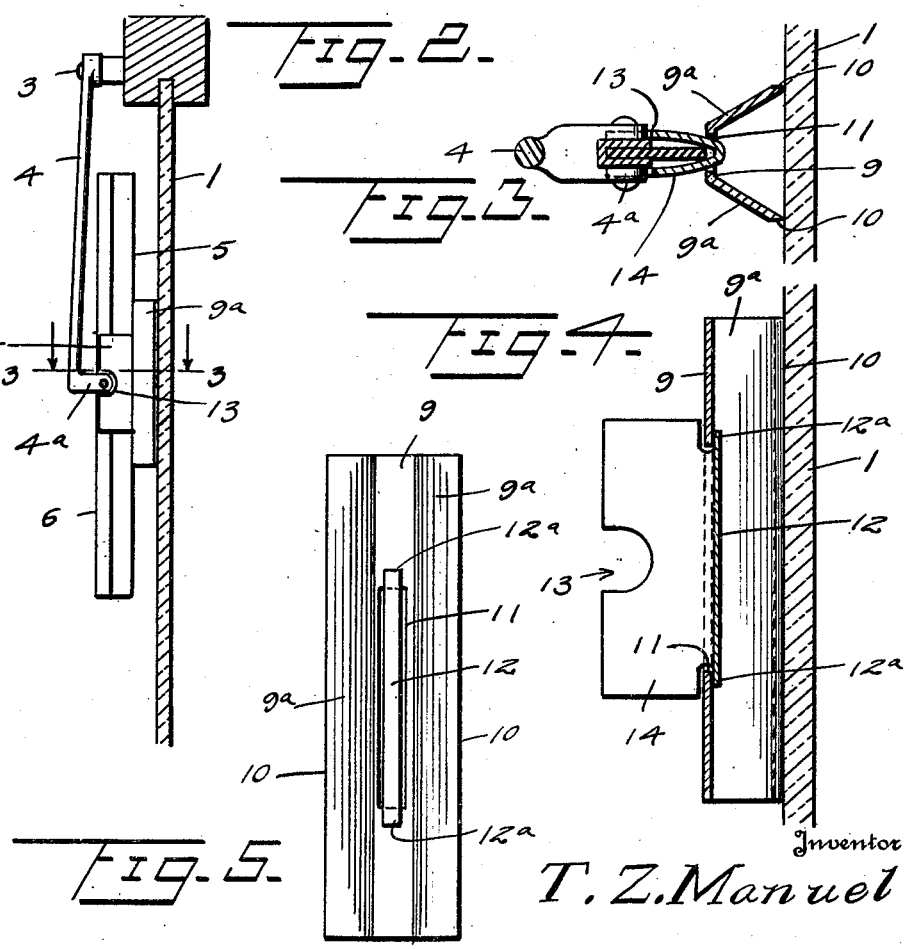

Patented Feb. 23, 1932

1,846,885

UNITED STATES PATENT OFFICE

THEODORE Z. MANUEL, OF WINONA, MINNESOTA, ASSIGNOR OF TWO-THIRDS TO BENJAMIN J. JOHNSON AND ALLYN HARDWICK, BOTH OF WINONA, MINNESOTA

SLEET CUTTER OR SCRAPER FOR AUTOMOBILE WINDSHIELDS

Application filed August 16, 1930. Serial No. 475,763.

This invention relates to automobile windshield cleaners, and more particularly to a device adapted to be used for the purpose of cutting or scraping sleet from the outer sides of windshields.

The invention has for one of its objects to provide a device of the character stated which shall be adapted to be applied to a windshield wiper for operation thereby, and which shall be adapted during the operation thereof to cut or scrape sleet from that portion of the windshield located in the line of vision of the driver.

The invention has for a further object to provide a device of the character stated which shall be adapted to be applied to the wiper blade holder of a windshield wiper of any construction, which shall be adapted to be applied to such holder without the aid of screws or the like, and which shall be adapted to be easily and quickly applied to or removed from such holder.

The invention has for a further object to provide a device of the character stated which shall embody a blade having at opposite sides thereof two cutting or scraping edges so that it will function to remove the sleet during the movement thereof in opposite directions on the windshield by the wiper, and which shall embody a clip carrying the blade and adapted to be easily and quickly applied to or removed from the wiper blade holder of the windshield wiper.

The invention has for a further object to provide a device of the character stated wherein the blade shall be loosely connected to the clip, to the end that its cutting or scraping edges will at all time lie in full abutting contact with the windshield.

The invention has for a still further object to provide a device of the character stated which shall be simple, durable and highly efficient and shall be adapted to be manufactured and sold at a comparatively low cost.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is an elevational view illustrating the application of the sleet cutter or scraper to a windshield wiper and windshield;

Figure 2 is a sectional view taken on the vertical plane indicated by the line 2—2 of Figure 1;

Figure 3 is a sectional view taken on a horizontal plane indicated by the line 3—3 of Figure 2;

Figure 4 is a sectional view taken on a plane extending vertically and centrally through the sleet cutter or scraper and a fragmentary portion of the windshield, and Figure 5 is a view in rear elevation of the sleet cutter or scraper.

Referring in detail to the drawings, 1 designates a fragmentary portion of the windshield of an automobile, and 2 designates a wiper for the windshield. The wiper 2, which may be of any construction, is for the purpose of illustration shown as comprising a shaft 3 operable by a motor or hand crank, not shown, a spring arm 4 fixed at one end to the shaft and extending downwardly therefrom in advance of the windshield 1, a wiper blade 5, and a holder 6 for the blade. The holder 6 is pivoted between its ends, as at 7, to the lower end of the arm 4 which holds the blade 5 under pressure in contact with the front side of the windshield 1.

The sleet cutter or scraper 8 forming the subject matter of this application, comprises a metal blade 9 of elongated rectangular formation in elevation and of angular formation in horizontal or cross section. The blade 9 is adapted to be applied to the holder 6 in a manner to position its hollow side opposite the front side of the windshield 1 and to position its longitudinal or vertical edges in contact with said side of the windshield. These edges of the blade 9 are sharpened, as at 10, to enable the blade to cut or scrape sleet from the outer side of the windshield 1. The blade 9 is provided at the juncture of its members 9$^a$ with a longitudinal slot 11 for the reception of the head 12 of a clip 13.

The clip 13, which is employed to secure the blade 9 to the holder 6, is made of elastic metal, and comprises, in addition to the head 12, a pair of opposed jaws 14 which are adapted to frictionally contact with the opposite sides of the holder 6 to secure the blade 9 to the holder. The head 6 connects the rear edges of the jaws 14 and also serves to connect the blade 9 to the clip 13. The jaws 14, which are of elongated rectangular contour in plan, are longer than and extend above and below the head 12, and are provided in their front edges with notches or recesses 15. The jaws 14 extend forwardly from the blade 9, and contact with opposite sides of the central portion of the holder 6, the notches 15 receiving the lugs 4ª which are located at the lower end of the arm 4 and through which the pivot 7 passes. The head 12 extends rearwardly through the slot 11 in the blade 9, and after its application to the blade its ends are burred or extended, as at 12ª, to secure the blade to the clip 13. The blade 9 has a loose connection with the head 12 to permit it to rock about an axis parallel to the arm 4 so that its cutting edges 10 may at all times lie in full abutting contact with the front side of the windshield 1.

It should be apparent from the foregoing description, taken in connection with the accompanying drawings, that when the cutter or scraper 8 is applied to a windshield wiper, its blade 9 will lie between the wiper blade and the front side of the windshield, that the cutting edges 10 of the blade 9 will lie in full abutting contact with said side of the windshield, and that during the operation of the wiper, the blade 9 will be reciprocated in an arcuate path located in the line of vision of the driver of the automobile.

It will be further understood that the blade 9 will, during the reciprocation thereof, cut or scrape sleet from an arcuate portion of the windshield located directly in line of the vision of the driver and will maintain such portion free of sleet. It will be still further understood that the blade 9 and clip 13 may be each manufactured from a single blank of steel or other suitable metal, that the clip may be readily engaged with or disengaged from the wiper blade holder of the windshield wiper and that the cutter or scraper will be held against upward and downward movement with respect to such holder by reason of the engagement of the clip with the pivot receiving lugs of the wiper arm.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A sleet cutter or scraper for a windshield, comprising a blade of angular form in cross section and having the free longitudinal edges of its members sharpened, the blade being provided at the juncture of its members with a longitudinal slot, and a clip having a head extending into said slot and provided with end portions extending beyond the ends of the slot and contacting with the inner side of the blade to rockably secure the blade to the clip.

2. A sleet cutter or scraper attachment for a windshield cleaner having a wiper blade, comprising a clip for application to the wiper blade, a scraper blade having laterally spaced active edges, and means loosely connecting the scraper blade to the clip to permit both active edges of the scraper blade to simultaneously contact with the windshield.

3. A sleet cutter or scraper attachment for a windshield cleaner having a wiper blade, comprising a clip for application to the wiper blade, a scraper blade having laterally spaced active edges, and means connecting the scraper blade to the clip for movement about an axis parallel to the wiper blade so as to permit both edges of the scraper blade to simultaneously contact with the windshield.

In testimony whereof I hereunto affix my signature.

THEODORE Z. MANUEL.